(12) United States Patent
Aerts

(10) Patent No.: US 8,037,503 B2
(45) Date of Patent: Oct. 11, 2011

(54) METHOD OF AND DEVICE FOR CACHING DIGITAL CONTENT DATA

(75) Inventor: Steven G. E. Aerts, Leuven (BE)

(73) Assignee: NXP B.V., Eindhoven (NL)

( * ) Notice: Subject to any disclaimer, the term of this patent is extended or adjusted under 35 U.S.C. 154(b) by 981 days.

(21) Appl. No.: 10/542,135

(22) PCT Filed: Dec. 10, 2003

(86) PCT No.: PCT/IB03/06296
§ 371 (c)(1),
(2), (4) Date: Jul. 12, 2005

(87) PCT Pub. No.: WO2004/064066
PCT Pub. Date: Jul. 29, 2004

(65) Prior Publication Data
US 2006/0059533 A1    Mar. 16, 2006

(30) Foreign Application Priority Data
Jan. 16, 2003 (EP) .................................. 03100072

(51) Int. Cl.
*H04N 7/173* (2011.01)
(52) U.S. Cl. ............. 725/88; 725/90; 725/100; 725/142
(58) Field of Classification Search .................. 725/142, 725/90, 94
See application file for complete search history.

(56) References Cited

U.S. PATENT DOCUMENTS

| 5,717,816 | A | * | 2/1998 | Boyce et al. | 386/111 |
| 5,799,128 | A | * | 8/1998 | Van Den Enden | 386/68 |
| 5,867,625 | A | * | 2/1999 | McLaren | 386/68 |
| 6,185,340 | B1 | * | 2/2001 | Comer | 382/236 |
| 6,389,218 | B2 | * | 5/2002 | Gordon et al. | 386/68 |
| 6,652,056 | B2 | * | 11/2003 | Shioya | 347/12 |
| 2001/0026677 | A1 | * | 10/2001 | Chen et al. | 386/68 |
| 2002/0114331 | A1 | | 8/2002 | Cheung et al. | |
| 2002/0168175 | A1 | * | 11/2002 | Green et al. | 386/68 |
| 2003/0072555 | A1 | * | 4/2003 | Yap et al. | 386/40 |
| 2003/0093801 | A1 | * | 5/2003 | Lin et al. | 725/90 |
| 2004/0255330 | A1 | * | 12/2004 | Logan | 725/115 |
| 2004/0264924 | A1 | * | 12/2004 | Campisano et al. | 386/68 |

FOREIGN PATENT DOCUMENTS

| EP | 0867879 A2 | 9/1998 |
| JP | 5-274798 | 10/1993 |
| JP | 8-265689 | 10/1996 |
| JP | 11-346340 | 12/1999 |
| JP | 2000-285589 | 10/2000 |
| WO | 02/35832 | 5/2002 |

* cited by examiner

*Primary Examiner* — Pankaj Kumar
*Assistant Examiner* — Timothy Newlin

(57) ABSTRACT

The disclosure relates to a method of caching a part of digital content data from a content source (202), comprising the step of: acquiring the digital content data from the content source (202), wherein said part of the digital content data comprises interleaved segments (130; 131) of the acquired digital content data, and said interleaved segments (130; 131) of the acquired digital content data are stored on first storage means (203), thereby allowing for fast access to said digital content data. The disclosure moreover relates to a device for carrying out such a method. The content sources can be DVD, CD, CD-ROM, hard disk, RAM, Flash memory or remote sources accessible over a network, such as the Internet.

11 Claims, 3 Drawing Sheets

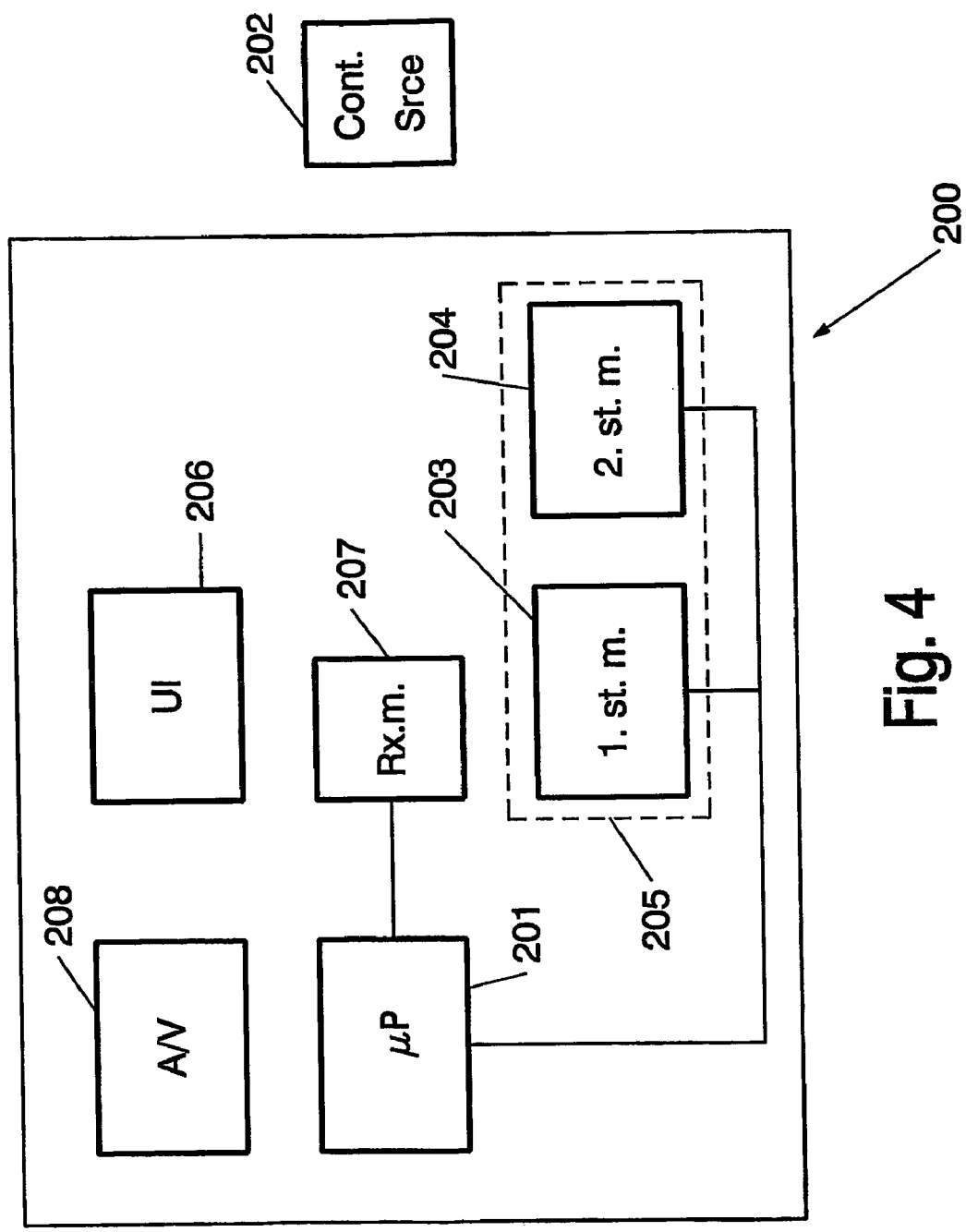

METHOD OF AND DEVICE FOR CACHING DIGITAL CONTENT DATA

This invention relates to a method of caching a part of digital content data retrieved from a content source and a corresponding device for carrying out such a method.

The development within the area of consumer electronic applications has been tremendous in recent years. Users have got accustomed to advanced, digital devices, which store, acquire, process and/or present data with a huge variety of purposes and functions, such as for example personal computers, PDA's, CD-players (portable and non-portable), DVD-players, MP3-players.

This development in the consumer electronic (CE) applications has gone hand in hand with the increasing amounts of data to be stored, acquired, processed and/or presented. For this reason the memory capacities and the storage, acquisition and processing time have become important factors in the popularity of and demand for specific consumer electronic applications.

Typically, data to be processed by a CE application are stored on volatile or non-volatile storage means, e.g. a DVD, CD, hard disk, RAM-memory, Flash-memory, and are accessed in a reading operation, where the acquisition of data can be in data streams of different size in dependence on the application and the specific storage means. Alternatively, the data to be processed by a CE application can be stored on a remote data source and can be accessed via a network, e.g. the Internet.

In the field of audio and/or video CE applications an audio and/or video (A/V) stream of data can be presented in a normal playback mode or in a so-called audible and/or visible trick play mode, e.g. audible and/or visible rewind (REW), fast forward (FFWD) and/or title scan/intro scan, wherein short parts of the A/V data content is presented interleaved by the A/V CE application. The response times for A/V CE applications during audible and/or visible trick play mode is one out of a plurality of competitive factors relating to the users' favours, since waiting for the application to react can be quite a source of irritation.

In general, the trick play mode is typically provided for in one out of two ways: by storing at least a part of the content stream in a cache memory from which interleaved content is presented, or by re-acquisition of the content stream from the content source. The former solution is memory consuming and the latter is time consuming.

In multimedia CE applications containing disc systems (e.g. hard disks, optical disks), a reading head will typically be acquiring content from the disk during normal play back. During trick play by means of re-acquisition the reading head will be moving rapidly in acquiring data from the disk to present segments of the content stream interleaved. This has the problem of causing tear and wear on the system, since it implies an additional acquisition of data with a rapid movement of the reading head as compared to normal play back.

The other possibility by storing the content in a cache memory during acquisition so that this cache memory can be sought during trick play provides for trick play without reacquisition and possibly without movement of the reading head. A drawback with this solution is, as mentioned above, that it is considerably memory consuming, since extra memory is needed to store a complete part of the content stream.

Normally, the two solutions are combined so that a part of the content stream is kept in a cache memory and so that additional content can be acquired from the content source in case of the trick play continuing beyond the data kept in the cache memory. Even though this combination can make up for some of the disadvantages of the two solutions in themselves, it is in general not sufficient to provide for an efficient trick play arrangement with a short response time and reasonable memory consumption, where the response time is meant to cover the time from when a user activates a trick play function on an interface on the audio and/or video application device, until the presentation of the required trick play data to the user commences.

An object of the present invention is to provide a method of caching a part of a digital content stream with a time and/or memory efficient trick play arrangement and a device for performing such a method.

The method according to the invention comprises the step of acquiring the digital content from a content source, and wherein said part of the digital content data comprises interleaved segments of the acquired digital content data, and where the interleaved segments of the acquired digital content data are stored on first storage means, thereby allowing for fast access to said part of the digital content data. In this way an interleaving of cache segments takes place before caching rather than at presentation, which results in less memory requirements to trick play in an content presentation system and faster trick play response times compared to prior art content presentation systems.

According to a preferred embodiment of the method, the digital content data are digital audio and/or video data. Hereby, the method is suitable for interleaved caching of audio and/or video data from content sources, such as compact discs (CD), CD-ROMs, hard disks (HDD), digital versatile discs (DVD), random access memory (RAM), Flash memory, or a remote source, such as Internet radio.

A preferred embodiment of the method according to the invention further comprises playing back the stored digital content data stored on the content source, and storing of interleaved cache segments takes place at or after replay. Hereby the provision of cache segments for trick play is performed simultaneously with provision of data for play back and with no further acquisition of the data.

When the storing of interleaved cache segments in the method according to the invention depends on parameters, which at least take account for the probability of replay and/or the acquisition time, an optimised method is provided with the potential that a transition from acquiring data from the first storage means to reacquiring data from the content source means can be performed smoothly, i.e. without breaks in the acquisition.

In a preferred embodiment of the method according to the invention the digital data are video data in MPEG format and that the interleaved data are I-pictures, whereby an effective way of choosing the digital content to be cached interleaved is provided. In yet another preferred embodiment of the method according to the invention the interleaved data are a continuously acquired part of the digital content data on the digital content source, whereby short fragments of the digital data at normal speed are cached interleaved.

In yet another preferred embodiment of the method according to the invention, the method further comprises storing a first part of the content data in a second storage means, which first part of digital data is suitable for use as anti-shock buffer data, where the storing of the digital data can be continuous or intermittent. Hereby, the method both provides for trick play with fast response times and anti-shock buffering. A continuous storing of the digital content data typically is performed by acquiring the data at a constant acquisition speed, whereas an intermittent storing of the digital content data can be by acquisition at a fast speed succeeded by a pausing before a next acquisition at the fast speed.

When the first storage means and the second storage means are comprised in a single memory circuit as in a preferred embodiment of the invention, an especially memory efficient method is provided.

In a preferred embodiment of the method, the content source is a storage medium. Examples of a storage medium are: compact discs (CD), CD-ROMS, hard disks (HDD), digital versatile discs (DVD), random access memory (RAM), Flash memory, etc.

In another preferred embodiment of the method, the content source is a remote source, and the acquisition of the digital content data comprises receiving the digital content data over a network. Hereby, the method can be used for acquisition of data from a remote source, such as Internet radio.

The invention will be explained more fully below in connection with preferred embodiments and with reference to the drawing, in which:

FIG. 4 shows a schematic view of a device for embodying the invention.

It should be noted, that the same reference signs are meant to identify the same features throughout the description of the figures.

Figure 1A:
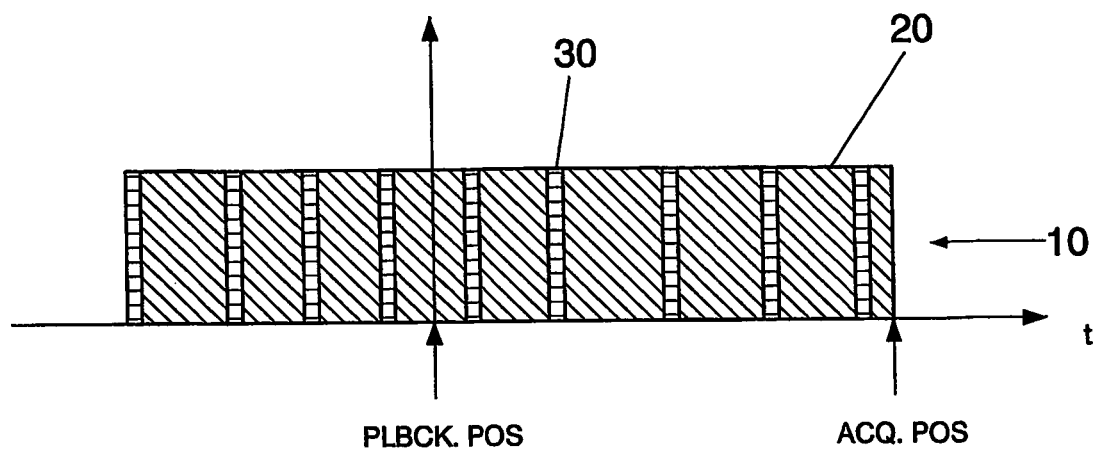
FIG. 1a is a schematic view of a part of data from a content source to be stored on a storage means according to the prior art.

FIG. 1a is a schematic view of a part of data 10 from a content source to be stored on a first storage means according to the prior art for playback and buffering of the data. The horizontal axis shows time elapsed, and the vertical axis represents digital data. The portion of data to the left of the vertical axis represents a rewind buffer, and the portion of data to the right of the vertical axis represents a forward buffer. The purpose of the forward buffer is both to have a shock buffer (preferably in portable devices) and to provide the possibility of fast-forward. The data in the rewind buffer is kept to provide the possibility of fast rewind. Typically, the forward buffer and the rewind buffer are a single buffer memory.

The playback position PLBCK. POS is the position of which data is to be represented as opposed to the acquisition position ACQ. POS. The acquisition position represents the reading of data stored on the first data into buffer. In the figures, the data are shown schematically and the blocks of data shown are meant to represent shorter or longer parts of data, that can be played back continuously. The interval between PLBCK. POS and ACQ. POS represents the size of the forward buffer; typically this can be up to several minutes of digital audio and/or video data for present portable devices.

The figure indicates, that the data 10 contains buffer data 20 and a different part of data 30; however, it should be noted that according to the prior art this data are stored on one and the same storage means, and that the discrimination between the two types of data 20, 30 only serves explanatory purposes. According to the prior art, the data 10 are used as an anti-shock buffer in e.g. portable devices, such as portable CD-players, DVD-players, MP3-players, and PDA's. At trick play, the data 10 are searched and interleaved segments 30 (shown with horizontal hatching) are played back, i.e. the process of choosing which parts of data to present during the trick play is performed after the storage of the data 10.

Figure 1B:
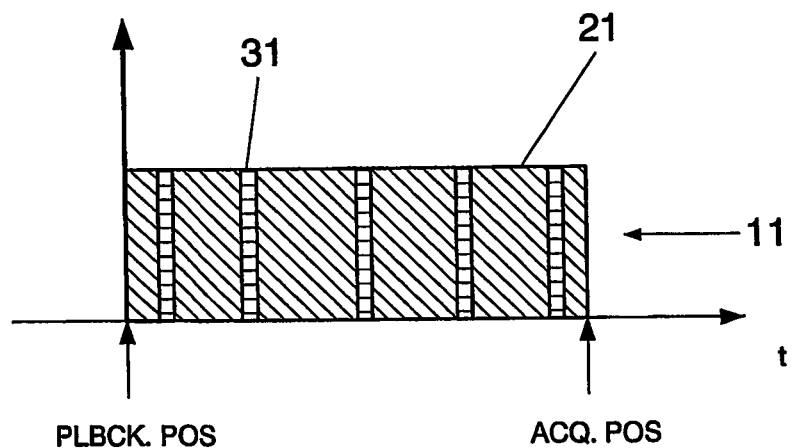
FIG. 1b is a schematic view of another part of data from a content source to be stored on a storage means according to the prior art.

FIG. 1b is a schematic view of another part of data from a content source to be stored on a storage means according to the prior art. In FIG. 1b data 11, comprising parts of data 21 and 31, are kept in a forward buffer, which serves as a anti-shock buffer (preferably in portable devices); after playback of the data 11 in the buffer, these data 11 are thrown away. The forward buffer also provides the possibility of fast-forward without re-acquisition, where the choice of which parts 31 to present during trick play takes place at presentation. Again, the discrimination between the two types of data 21, 31 only serves explanatory purposes and the data 21, 31 are stored on one and the same storage means. In FIG. 1b there are no data in a rewind buffer for fast rewind, so that this function has to entail re-acquisition of data from the content source, which is power consuming, can cause mechanical wear and tear and which possibly will entail increased response time.

Figure 2:
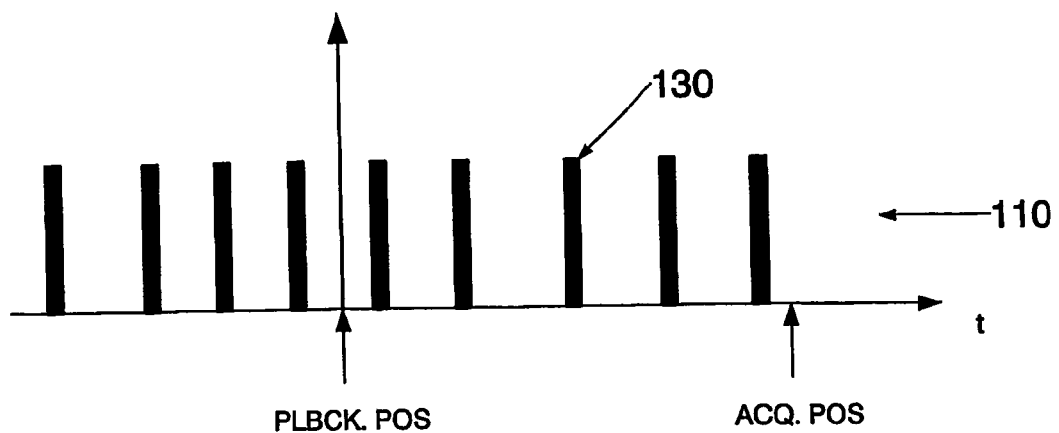
FIG. 2 shows a schematic view of a part of data from a content source to be stored on a first storage means according to the invention.

FIG. 2 shows a schematic view of a part of data from a content source to be stored on a first storage means according to the invention. The first storage means could be RAM, Flash Memory or a hard disk, whereas the content source could be a storage medium, such as a compact disc (CD), a CD-ROM, a hard disk ADD), digital versatile disc (DVD), random access memory (RAM), Flash memory, or a remote source such as a network. In FIG. 2, data 110 of digital content are acquired as interleaved segments of data 130 from the content source. Naturally, these interleaved segments are typically stored contiguously in the first storage means and they are shown here as distinct segments to stress that only a fraction of the data from the content source are acquired and stored on the first storage means for trick lay.

In the case where the digital data are video data in MPEG format, the interleaved data could be the I-pictures. In other cases the interleaved data would typically be continuously acquired part of the digital content data on the content source, i.e. short fragments of the digital data at normal play back speed.

In FIG. 2 ACQ. POS is shown to the right of PLBCK. POS, which indicates, that acquisition is taking place before playing back. However, in case of playing back of multiple tracks, e.g. pieces of music from a CD, in an arbitrary order, a cache can be built up in the first storage means for this set of tracks, as they are being acquired and played back. These data can be kept or thrown away based on replay probability, which can be simulated by means of models (which are beyond the scope of this invention), and thus forward cache may exist to the right of ACQ. POS depending on playback history.

The advantages of this way of caching data from the content source are faster response time to user requests, no or less re-acquisition in case of FFWD/REW/Title scan/Intro scan functions and less memory buffer requirements for buffering for audible and/or visible trick play.

Figure 3:
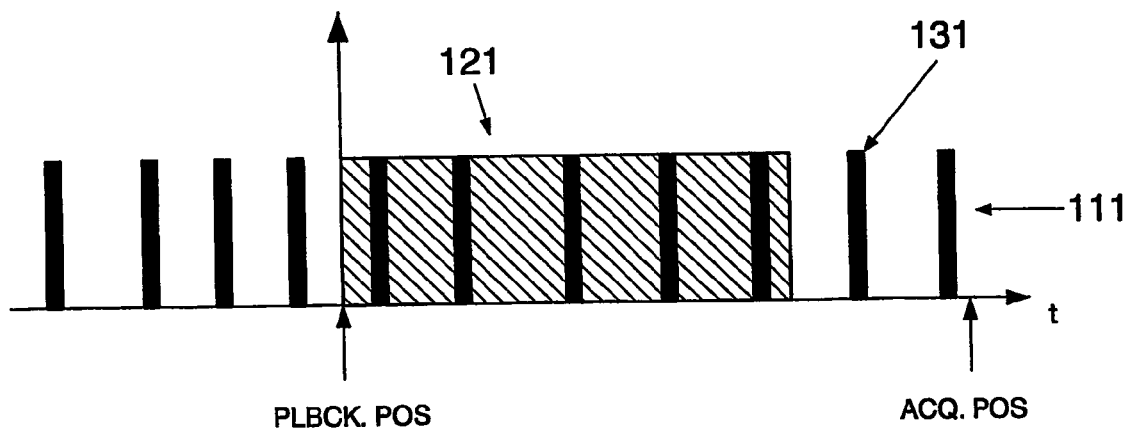
FIG. 3 shows a schematic view of data from a content source to be stored in a first second storage means and in a second storage means according to another embodiment of the invention.

FIG. 3 shows a schematic view of data from a content source to be stored in a first storage means and in a second storage means according to another embodiment of the invention. Both the first and the second storage means could be RAM, flash Memory or a hard disk, whereas the content source could be a storage means such as any of the following: a compact disc (CD), a CD-ROM, a hard disk (HDD), digital versatile disc (DVD), random access memory (RAM), or a remote content source such as a network.

In FIG. 3, digital content data 111 are acquired as a part of the data from the content source, which data 111 are both acquired as interleaved segments 131 of data and a contiguous part 121 of data. The interleaved segments 131 are stored contiguously in the first storage means and they are shown here as distinct segments to stress that only a fraction of the data from the content source are acquired and stored as interleaved segments on the first storage means for use in trick play. The contiguous part 121 of the digital data from the content source is stored in the second storage means and serves as an anti-shock buffer.

This storing of both interleaved segments 131 of data for trick play and of a contiguous part 121 of data gives the advantage of having both an intelligent, fast trick play function and an anti-shock buffer, yielding less mechanical wear and tear, shorter response times, anti-shock buffering, less power consumption and possibly also less memory requirements, depending on the parameters determining the amounts of data, which are stored in the first and the second storage means. The parameters determining the amounts of data for storage could be acquisition time on the content source, i.e. access time, probability of play back, the playing position, etc. For instance, the cache size of one segment 131 of the interleaved stream can be optimised such that re-acquisition can take place during playback of that particular segment, in case a user chooses to stop trick play and recommence playback at the given position.

In a particular embodiment of the invention, the first and the second storage means are comprised in a single memory circuit, whereby no redundant data storage is necessary rendering this embodiment particularly memory saving.

FIGS. 2 and 3 have been described in relation to content source could be a remote source such as a network or a storage means such as a compact disc (CD), a CD-ROM, a hard disk ADD), digital versatile disc (DVD), random access memory (RAM) and first and eventually second storage means being a CD, RAM, Flash Memory or a hard disk. Devices for implementing the method illustrated in FIGS. 2 and 3 could be personal computers, PDA's, CD-players, DVD-players, MP3-players, internet audio players, etc.

It should be noted that interleaved segments 131 to the right of the ACQ POS in FIG. 3 could be present, if a user of the device incorporating the method according to the invention has played back some of the digital content data retrieved from the content source earlier, e.g. at playing back tracks from a CD in arbitrary order. The abovementioned parameters determining the amounts of data to be stored could include for how long data should be kept and which data should be kept or thrown away based on replay probability.

FIG. 4 shows a schematic view of a device for embodying the invention. Shown in FIG. 4 is a device 200 according to the present invention comprising one or more microprocessors 201 with a connection to a means for receiving 207 a content source and connected to a first storage means 203 and a second storage means 204. Shown is also a content source 202 to be received in the receiving means 207 in the device 200. The content source 202 is typically a storage medium such a compact disc (CD), a CD-ROM, a hard disk (HDD), digital versatile disc (DVD), random access memory (RAM), and as such the content source could be either fixed in the receiving means 207 of the device 200 or be able to be easily inserted into and retracted from the device 200. However, the content source could also be a remote source; in this case the receiving means 207 would be means for receiving digital data via a network, e.g. the Internet.

The device 200 could be any digital apparatus comprising a multimedia player, e.g. personal computers, CD-players, DVD-players, MP3-players, or PDA's. If the content source is a remote source, the device 200 should also contain means for connection to a network, such as a modem, ISDN, ADSL, etc. Such devices are known per se, and therefore only those features of the device, which are essential for explaining the invention, will be described. The first and the second storage means could be RAM, Flash Memory or a hard disk, and is typically essentially stationary in the device. In one preferred embodiment of the device according to the invention, the first and the second storage means are comprised in a single memory circuit, which is indicated by the broken line 205. Moreover, the device 200 is provided with a user interface UI 206 providing the possibility to navigate through the functions of the device. Examples of these functions are: play back, stop, pause, fast-forward (possibly audible and/or visible), rewind (possibly audible and/or visible), audible and/or visible title scan or intro scan, etc. The user interface typically comprises further components, which lie beyond the scope of this invention and which therefore are not described here or shown in the figures. The device 200 further contains components 208 for presenting content, such as audio and/or video components for presenting digital audio and/or video data to a user. Typically, the audio components are loudspeakers and the video components could comprise a screen, a display, a projection display system, etc.

The invention relates to a method of caching a part of digital content data from a content source (202), comprising the step of: acquiring the digital content data from the content source (202), wherein said part of the digital content data comprises interleaved segments (130; 131) of the acquired digital content data, and said interleaved segments (130; 131) of the acquired digital content data are stored on first storage means (203), thereby allowing for fast access to said digital content data. The invention moreover relates to a device for carrying out such a method. The content sources can be DVD, CD, CD-ROM, hard disk, RAM, Flash memory or remote sources accessible over a network, such as the Internet.

The invention claimed is:

1. A device for caching a part of digital content data including I-frames and non-I-frames and interleave segments and from a content source, comprising:
   a receiver to acquire the digital content data from the content source, a processor configured and arranged to
      separate the I-frames from the non-I-frames to generate a block of multiple I-frames that includes temporally disparate I-frames, wherein the processor is configured and arranged to separate the I-frames from the non-I-frames during the standard play mode and to cache the block of separated I-frames without the non-I-frames during the standard play mode;
   cache the block of separated I-frames without the non-I-frames;
   flush ones of the separated I-frames as a function of a current playback location;
   cache a portion of the digital content data that includes both the I-frames and the non-I-frames;
   access the cached digital content data, including both I-frames and non-I-frames, in response to a standard play mode; and
   access the cached block of I-frames in response to a trick play mode.

2. A device according to claim 1, wherein the cached block of separated I-frames includes a number of I-frames that is determined based on at least a probability of replay of the received digital content data and an acquisition time of the received digital content data.

3. A device according to claim 1, characterized in that the digital content data are video data in MPEG format and that the interleaved segments of the acquired digital content data are I-pictures.

4. A device according to claim 1, wherein the content source is a storage medium.

5. A device according to claim 1, wherein the content source is a remote source, and wherein the receiver is adapted to receive data over a network.

6. A method of caching data, the method comprising:
   receiving digital content data from a content source, the digital content data including interleaved segments of data and including I-frames and non-I-frames;
   during a standard play mode,
      caching a portion of the digital content data that includes both I-frames and non-I-frames,
      accessing the cached portion of the digital content data that includes both I-frames and non-I-frames for playback,
      separating I-frames of the received digital content data from non-I-frames of the received digital content data to generate a block of multiple I-frames that includes temporally disparate I-frames,
      caching the block of separated I-frames without any non-I-frames, and
      flushing ones of the separated I-frames as a function of a current playback location; and
   in response to selection of a trick play mode, accessing the cached block of separated I-frames for playback.

7. The method of claim 6, wherein the cached block of separated I-frames includes multiple I-frames from both before and after a current playback position.

8. The method of claim 6, wherein receiving digital content data from a content source includes receiving the digital content data from a remote content source over a network.

9. The method of claim 6, wherein the cached block of separated I-frames includes a number of I-frames that is determined based on at least a probability of replay of the received digital content data and an acquisition time of the received digital content data.

10. The method according to claim 6, characterized in that the digital content data are video data in MPEG format and that the interleaved segments of the acquired digital content data are I-pictures.

11. The method according to claim 6, wherein the content source is a storage medium.

* * * * *